United States Patent [19]

Kamata et al.

[11] Patent Number: 4,472,032

[45] Date of Patent: Sep. 18, 1984

[54] ZOOM LENS ASSEMBLY

[75] Inventors: Shigeru Kamata, Tokyo; Takasi Isobe, Kanagawa, both of Japan

[73] Assignee: Canon Kabushiki Kaisha, Tokyo, Japan

[21] Appl. No.: 336,687

[22] Filed: Jan. 4, 1982

[30] Foreign Application Priority Data

Jan. 12, 1981 [JP] Japan ................... 56-2874

[51] Int. Cl.³ ............................................. G02B 7/10
[52] U.S. Cl. ................................................... 350/429
[58] Field of Search ......................................... 350/429

[56] References Cited

U.S. PATENT DOCUMENTS 4,386,829  6/1983  Sumi ........................... 350/429

*Primary Examiner*—John K. Corbin
*Assistant Examiner*—Rebecca D. Gass
*Attorney, Agent, or Firm*—Toren, McGeady and Stanger

[57] ABSTRACT

A zoom lens assembly wherein first and second lens elements are moved simultaneously to effect zooming operation and wherein the first lens element is moved separately from the second lens element to effect focusing operation. A zoom operation member and a focusing operation member are operable through the structure of the elements of the assembly to effect, respectively, zooming and focusing operation and the arrangement of the invention permits simplification of the construction of the assembly wherein the desired operations may be accomplished.

8 Claims, 3 Drawing Figures

ZOOM LENS ASSEMBLY

The present invention relates generally to optical devices and more particularly to a zoom lens assembly. More specifically, the invention is related to a zoom lens assembly wherein two lens groups operate to effh the present invention relates are arranged to perform focusing action by movement of one of two lens groups, both of which contribute to a zooming operation, have been known and they are identified as two-group-type lens assemblies. The lens barrel of this type of assembly generally involves a shortcoming in that no polarizing filter is able to be used in combination therewith because of the fact that a lens holding member is arranged to move while rotating on the optical axis of the lens barrel when the lens group moves in the direction of the optical axis during a focusing operation.

In order to solve this problem, there has been proposed provision of a zoom lens barrel which is arranged to prevent the focusing lens group from rotating about the optical axis. An example of a prior art device of this type is shown in FIG. 1 of the accompanying drawings in longitudinal sectional view.

Referring to FIG. 1, in the example of the aforementioned zoom lens assembly of the prior art type discussed above, a lens barrel is provided which includes a lens mount 101 for mounting the lens barrel onto a camera. A first fixed tube 102 is formed into a single unit with the lens mount 101 by being attached thereto through screws or the like (not shown). The fixed tube 102 is provided with an opening 103. First and second lens barrels 104 and 105 which are arranged within the opening 103 are movable in the direction of the optical axis of the assembly. First and second lens groups 106 and 107 are held by the lens barrels 104 and 105. A helical groove 108 is provided along the outer circumference of the first lens barrel 104. A helical groove 109 is provided along the outer circumference of the second lens barrel 105. A second fixed tube 110 has the rear end thereof connected to the first fixed tube 102 in order thereby to be formed as a single unified member therewith. The second fixed tube 110 is provided with openings 111 and 112.

The lens barrel assembly depicted in FIG. 1 further includes a zoom ring 113 which is formed with a work plate 113a secured to the inner side thereof by means of a screw. The work plate 113a has a guide pin 113b mounted on the forward end portion thereof. The guide pin 113b is fitted in the helical groove 108.

The second fixed tube 110 is further provided with a helical slot 114. Within the second fixed tube 110 there is provided an interlocked tube 115 which is arranged to be rotatable and movable forwardly and rearwardly along the inner circumference of the second fixed tube 110. The interlocked tube 115 is provided with a guide groove 116 which is located in a position to cross the helibe 115 and is fitted in the helical groove 109. A range or focusing ring 118 is provided on the outer side of the second fixed tube 110. The ring 118 is provided with a guide pin 119 which is disposed on the inner face of the ring 118 and fitted into the guide groove 116 of the interlocked tube 115 through the helical slot 114 of the second fixed tube 110.

The zoom ring 113 has a guide pin 120 provided on the inner circumference thereof and fitted into the longitudinal slot 117 of the interlocked tube 115.

A guide pin 121 is disposed on the inner circumference of the first fixed tube 102. The guide pin 121 is fitted into a longitudinal slot 122 which is provided in the first lens barrel 104. Another guide pin 123 disposed on the inner circumference of the first fixed tube 102 is fitted into a longitudinal slot 124 which is provided in the second lens barrel 105.

In the operation of the lens barrel assembly previously described, when the range ring 118 is rotated, the guide pin 119 of the ring 118 will move helically along the helical slot 114 of the second fixed tube 110. The interlocked tube 115 has the guide pin 119 fitted in the guide groove 116 thereof and it also has the guide pin 120 of the zoom ring 113 fitted in the longitudinal slot 117 provided in the rear end portion thereof. Therefore, the interlocked tube 115 will move forwardly or backwardly accordingly as the aforementioned helical movement occurs. Furthermore, since the guide pin 115a of the interlocked tube 115 is fitted in the helical groove 109 of the second lens barrel 105, the second lens barrel 105 also moves forwardly or rearwardly together with the guide pin 115a. Since the guide pin 123 disposed on the first fixed tube 102 is fitted in the longitudinal slot 124 of the second lens barrel 105 and is thus restrained from rotating, the second lens barrel 105 moves only in the direction of the optical axis.

When the zoom ring 113 is rotated, the guide pin 113b arranged to rotate together with the ring 113 slides within the helical groove 108 of the first lens barrel 104. The first lens barrel 104 then moves forwardly or rearwardly along the optical axis while being restrained from rotative movement due to the relationship of the longitudinal slot 122 thereof with the guide pin 121 provided on the first fixed tube 102. In accordance with the arrangement of the prior art described herein, the zoom lens barrel assembly is formed of as many as six overlapping elements in a configuration which consists, taken from the radially outer side thereof, of the range ring 118, the second fixed tube 110, the interlocked tube 115, the second lens barrel 105, the first fixed tube 102, and the first lens barrel 104.

However, it will be noted that zoom lens assemblies of the type described are generally required to be of a small size, light in weight, and simple and advantageous in their operability with a low selling price. In order to meet these requirements, the structure of such a lens assembly must be simplified to the extent possible and the mechanism thereof must be arranged so as to reduce the number of parts required in order to allow each part to perform many combined functions.

However, the construction of a zoom lens assembly necessitates the use of parts including lens holding members for a power varying lens and a compensating lens together with operation members for a focusing operation and a zooming operation. Furthermore, there is required a cam member for changing distance between the aforementioned two lens holding members to a predetermined extent while they are moved in the direction of the optical axis in accordance with the operation of the operation members. A fixed tube for carrying each of these members must be provided and a mechanism for moving a focusing lens during a focusing operation is necessary which will also maintain it in a nonrotative state.

Accordingly, it is generally considered inevitable to construct such a lens assembly from numerous overlapped layers of annular and tubular members included in the construction of the assembly.

However, an increase in the number of layers of such members and increased interrelationship between the members results in a decrease in the accuracy of operation of the members relative to each other. Performance and quality of the zoom lens assembly are thereby disadvantageously affected and lowered accuracy results.

The present invention is directed toward a solution of the problems of conventional zoom lens assemblies described above. The invention is generally directed toward provision of a zoom lens assembly having a construction which requires a reduced number of overlapped layers or parts of the constituent members.

SUMMARY OF THE INVENTION

Briefly, the present invention may be defined as a zoom lens assembly having an optical axis and adapted to effect focusing and zooming operation comprising: first lens holder means having first lens means mounted therein; second lens holder means having second lens means mounted therein; with movement of said first and said second lens holder means simultaneously along said optical axis operating to effect zooming operation and with movement of said first lens holder means along said optical axis separately from said second lens holder means operating to effect focusing operation; a zooming operating member operable upon rotation thereof to effect zooming operation; a focusing operation member operable upon rotation thereof to effect focusing operation; a first and a second intermediate member axially movable relative to each other but restrained from rotative movement relative to each other, said second intermediate member being fixed for rotation together with said zooming operation member; barrel means engaged with said second intermediate member to enable relative rotative movement therebetween but restraining relative axial movement therebetween; means interposed between said focusing operation member and said first intermediate member to effect axial movement of said first intermediate member independently of said second intermediate member upon rotation of said focusing operation member; means interposed between said first intermediate member and said first lens holder member to effect axial movement of said first lens holder member independently of said second lens holder member upon axial movement of said first intermediate member; and means interposed between said first and second intermediate members and said first and second lens holder members to effect simultaneous axial movement of said first and second lens holder members upon rotation of said first and second intermediate members; said second intermediate member being rotated by rotative movement of said zooming operation member and being restrained from axial movement by the engagement thereof with said barrel means; said first intermediate member being rotatable by the engagement thereof with said second intermediate member.

The barrel means may be formed as a pair of fixed tubular members with the first of said fixed tubular members being radially located between the first and second intermediate members and the first and second lens holder members and with the second of said fixed tubular members being located radially intermediate the focusing and zooming members and the first and second intermediate members. The first fixed tubular member contains a pair of axially directed slots within which there are engaged pins of the first and second lens holding members, respectively. The first and second intermediate members include, respectively, slanted slots with the pin of the first lens holder member being engaged in the slanted slot of the first intermediate member and with the pin of the second lens holder member being engaged in the slanted slot of the second intermediate member after having passed through the axial slots of the first tubular member.

In similar fashion, the focusing operation member includes a slanted slot circumferentially relative to the first intermediate member but is fixed thereto in the axial direction of the lens assembly to drive the first intermediate member axially upon axial movement of the pin.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
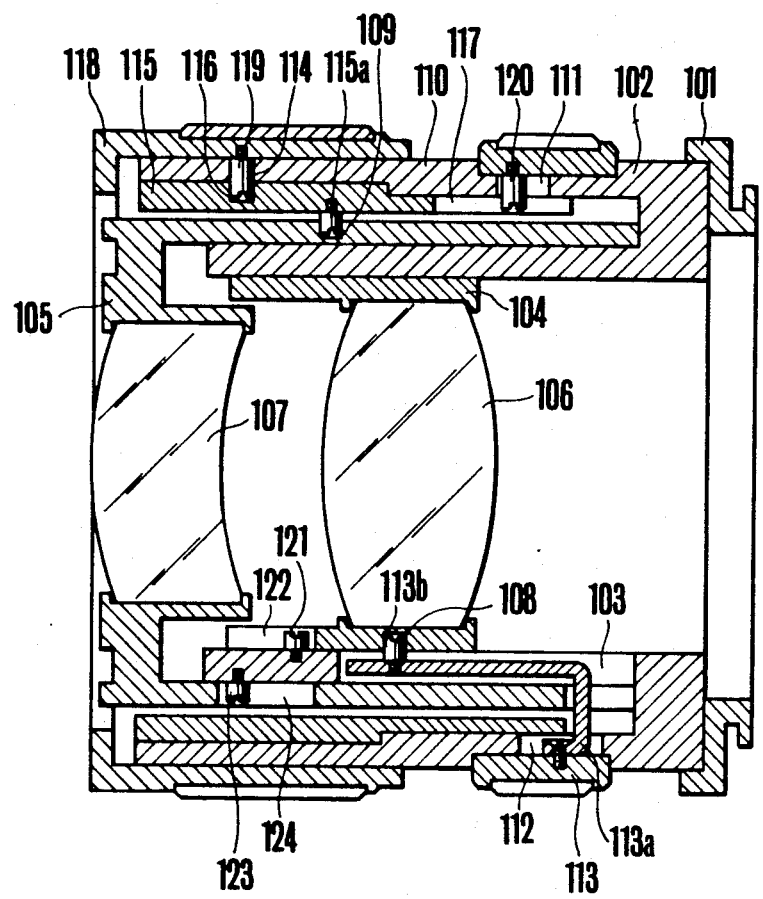
FIG. 1 is a longitudinal sectional view of a prior art zoom lens assembly.
Figure 2:
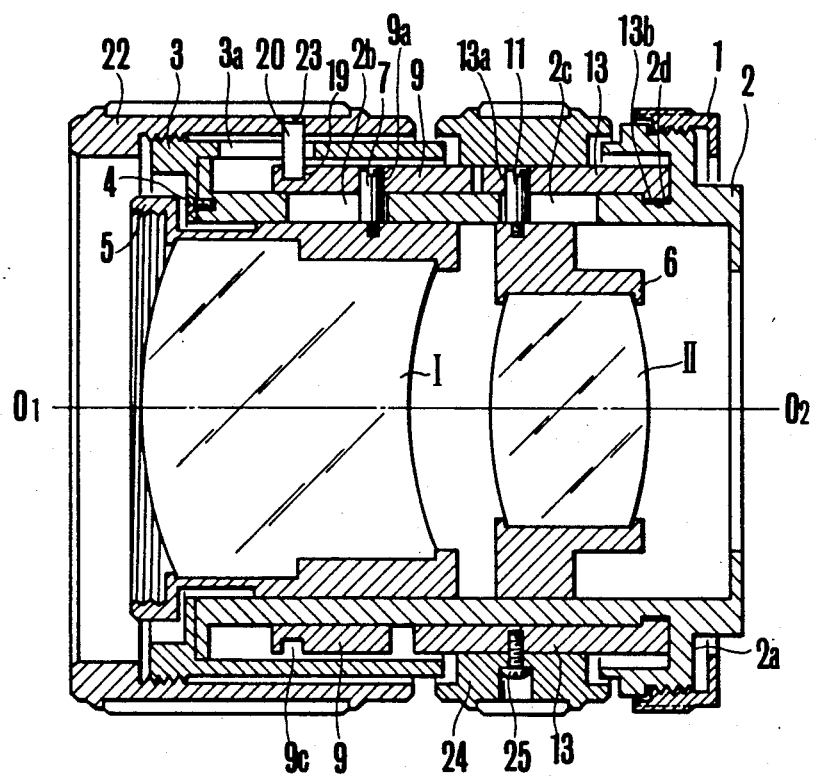
FIG. 2 is a longitudinal sectional view of an assembly in accordance with the present invention.
Figure 3:
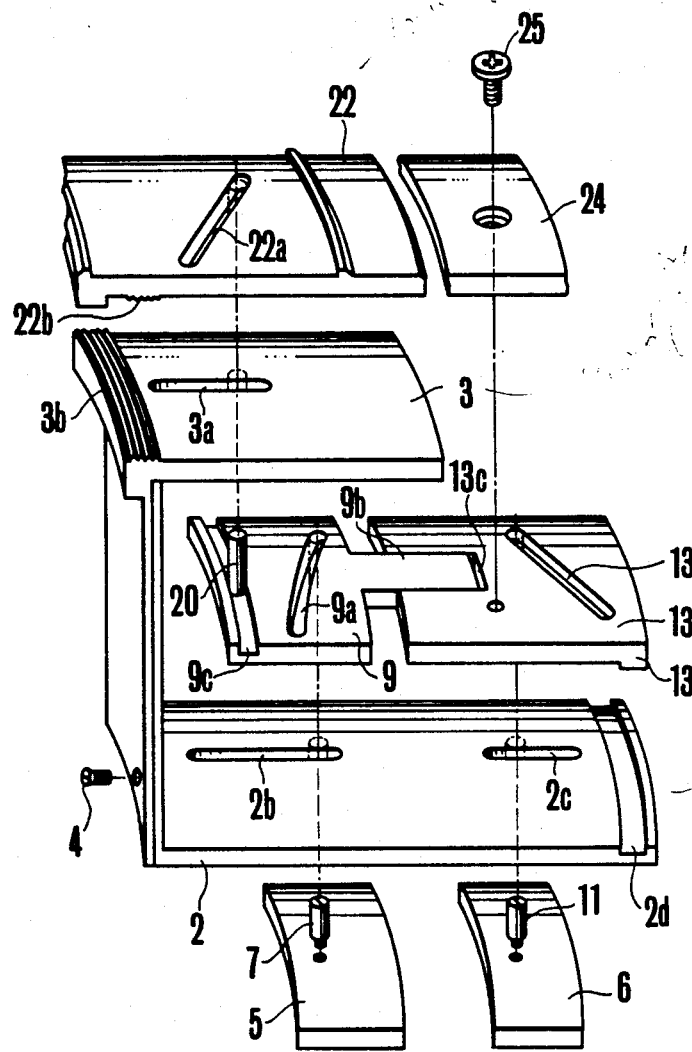
FIG. 3 is an exploded perspective view of the essential parts of the embodiment of the invention shown in FIG. 2.

Referring now to the drawings, and particularly to FIGS. 2 and 3 thereof, there is shown an embodiment of the invention which comprises a clamp ring 1 for mounting the zoom lens assembly shown in FIG. 1 onto a camera by utilization of known means. A first fixed tube 2 of the assembly is provided with a mount face 2a at the rear end thereof and a second fixed tube 3 is connected to the forward end of the first fixed tube 2 and is arranged into a single unified member therewith by means of a screw 4.

The assembly shown in FIG. 2 includes a first lens holding member 5 within which there is mounted a first lens element I and a second lens holding member 6 within which there is mounted a second lens element II. Both the lens holding members 5 and 6 are movably held within the inner diameter of the fixed tube 2. A guide pin 7 is mounted on the first lens holding member 5 and extends through a longitudinal slot 2b formed in the fixed tube 2. The pin 7 extends into engagement within a cam slot 9a provided in a first cam or intermediate member 9. A guide pin 11 is mounted on the second lens holding member 6 and extends through a longitudinal slot 2c in the first tube 2, with the pin 11 extending into fitted engagement in a cam slot 13a provided in a second cam or intermediate member 13.

The second cam member 13 includes a protuberant part 13b which is disposed at the rear end thereof and which is fitted into a recessed part 2d of the fixed tube 2.

The second cam member 13 is thus restrained from movement in the axial direction along the optical axis of the zoom lens assembly and it is also arranged so as to be rotatable thereabout.

The second cam member 13 is further provided with a cutout part 13c at the forward end thereof. The first cam member 9 includes an engaging part 9b which is fitted into the cutout part 13c of the second cam member 13.

An interlocking pin 20 is provided which is fitted into a circumferential groove 9c of the first cam member 9 and which engages a slanted slot 22a of a focusing operation member 22. The pin 20 extends between the groove 9c and the slanted slot 22a through a longitudinal slot 3a formed in the second fixed tube 3. The focusing operation member 22 and the second fixed tube 3 are in ted to the second cam member 13 by a screw 25 so that the second cam member 13 is rotatably fixed with the zooming operation member 24 in order to be rotatable therewith.

In the operation of the zoom lens assembly of the invention depicted in FIGS. 2 and 3, when the zooming operation member 24 is rotated, the second cam member 13 will be rotated therewith. Since the first cam member 9 is arranged to be rotatably fixed relative to the second cam member 13 by means of the engaging part 9b fitted in the cutout part 13c, rotation of the second cam member 13 will be transmitted to the first cam member 9 thereby causing the first cam member 9 to rotate together with the second cam member 13.

Since the protrudent part 13b of the second cam member 13 is fitted in the recessed part 2d of the first fixed tube 2, the second cam member 13 will be restrained from movement in the direction of the optical axis while being capable of rotative movement thereabout.

Since the interlocking pin 20 is fitted in the circumferential groove 9c of the first cam member 9 and since it extends through a longitudinal slot 3a of the second fixed tube 3 being fitted also in engagement with the slanted slot 22a of the focusing operation member 22, the first cam member 9 will also be restrained from movement in the direction of the optical axis but will be rotatable together with the second cam member 13.

The guide pins 7 and 11 which are mounted, respectively, on the first and second lens holding members 5 and 6 engage in the longitudinal slots 2b and 2c provided in the fixed tube 2. Furthermore, the pins 7 and 11 extend into engagement with the cam slots 9a and 13a provided in the first and second cam members 9 and 13, respectively. Therefore, with this engaging arrangement, the first and second lens holding members 5 and 6 will be moved in the direction of the optical axis simultaneously during a zooming operation which is effected by rotation of the zoom member 24 causing rotation of the second cam member 13, which rotation simultaneously causes the first cam member 9 to rotate therewith in order to effect axial movement simultaneously of the first and second lens holding members 5 and 6.

In order to effect focusing operation of the assembly depicted in FIGS. 2 and 3, the focusing operation member 22 is rotated whereby the interlocking pin 20 fitted in the slanted slot 22a provided in the focusing operation member 22 will move in the direction of the optical axis since it is fitted in the longitudinal slot 3a provided in the second fixed tube 3.

The circumferential groove 9c which receives the interlocking pin 20 will cause the first cam member 9 to move only in the direction of the optical axis upon axial movement of the interlocking pin 20. Since the protruberent part 13b of the second lens holding member 13 is in engagement with the recessed part 2d of the fixed tube 2, the second lens holding member 13 is restrained from moving in the direction of the optical axis and as a result, the first cam member 9 alone will move in the axial direction upon rotation of the focusing operation member 22. Movement of the first cam member 9 in the direction of the optical axis will be transmitted through the guide pin 7 to the first lens holding member 5. This will cause the first lens holding member 5 to move in the direction of the optical axis in order to perform a focusing action, and it will be noted that this focusing action will involve axial movement of the first lens holder member 5 only, without the second lens holder member 6 being moved.

As described in the foregoing, the zoom lens assembly in accordance with the invention involves moving means 22a, 3a, 20, and 9c for moving the first cam member 9 in the axial direction while maintaining it nonrotative relative to the optical axis is response to a turning operation of the focusing operation member 22. The moving means are provided between the focusing operation member 22 and the cam member 9 which is one of two cam members 9, 13 which are arranged to control the movement of the pins 7 and 11 provided in the lens holder members 5 and 6 which contribute to the zooming action. The basic operative features of the invention are thus attained by the provision of these moving means 22a, 3a, 20, and 9c.

Furthermore, in order to attain the operating characteristics of the invention, the zoom lens assembly includes converting means for transmitting to the cam member 9 only the linear axial motiol axis. The provision of this converting means enables the first lens holding member 5 to move linearly in the direction of the optical axis.

With the rotating force of the focusing operation member 22 converted by this converting means directly into a force for moving the first cam member 9 in accordance with the invention, the number of overlapping layers or elements of the assembly which have been included in the construction thereof can be reduced relative to the number in with the present invention is highly suitable for obtaining special effects with the use of, for example, a polarized light filter, a multifacet effect filter which is capable of expressing one object to be photographed in more than two images by varying the angles of a plurality of prisms within a filter device, and a soft effect filter which blurs the peripheral portions of the picture while sharply expressing the central image of the picture.

Generally speaking, it will be seen that the basic invention is thus composed of a focusing member 22, a zoom member 24 with lens holder members 5 and 6 being moved simultaneously in the axial direction upon rotation of the zoom member 24 and with only the lens holder member 5 being moved in a nonrotative state in the axial direction upon rotation of the focusing member 22.

The first and second cam members 9 and 13 may be considered first and second intermediate members, respectively, and the first and second tubes 2 and 3 essentially comprise a pair of fixed tubular members which may be considered to consist of barrel means with the first and second tubular members 2 and 3 being affixed relative to each other. Since the first and second intermediate cam members 9 and 13 are mounted to be in fixed rotative engagement with each other while also being axially movable relative to each other, rotation of the second cam or intermediate member 13 is transmitted to the first cam or intermediate member 9 but axial movement of the first cam or intermediate member 9, by operation of the focusing member 22, is not transmitted into axial movement of the second cam or intermediate member 13 during a focusing operation.

While a specific embodiment of the invention has been shown and described in detail to illustrate the application of the inventive principles, it will be understood that the invention may be embodied otherwise without departing from such principles.

What is claimed is:

1. A zoom lens assembly defining an optical axis comprising:
   a first fixed tube including first guide slot means;
   a focusing operation member which rotates relative to said first fixed tube to effect focusing operation of said assembly, said focusing operation member including second guide slot means;
   a zooming operation member for effecting zooming operation of said assembly;
   a first lens holder member having a first optical element mounted thereon and arranged to move linearly in the direction of said optical axis in response to both focusing operation and zooming operation of said assembly;
   a first intermediate member which moves in the direction of said optical axis by engaging said first guide slot means of said first fixed tube and said second guide slot means of said focusing operation member, said first intermediate member including an engaging part;
   a second fixed tube provided with a guide part for linearly moving said first holder member;
   an engaging member engaged with a cam slot provided on said first intermediate member and with a longitudinal slot of said second fixed tube, said engaging member fixed to said first lens holder member so as to move said first holder member in response to the movement of said first intermediate member;
   a second lens holder member arranged to hold a second optical element cooperative with said first optical element in response to zooming operation of said assembly;
   a second intermediate member rotatable together with said zooming operation member about said optical axis, said second intermediate member being provided with engaging means for engaging said first intermediate member, said engaging means being arranged to move said first intermediate member through said second intermediate member during zooming operation; and
   a guide member engaged with a guide slot provided on said second intermediate member and with a longitudinal slot of said second fixed tube, said guide member being fixed to said second lens holder member so as to move said second lens holder member in response to the movement of said second intermediate member.

2. A zoom lens assembly according to claim 1 wherein said longitudinal slot provided at said second fixed tube is arranged to cause said lens holder member to move linearly in accordance with rotation of said second intermediate member.

3. A zoom lens assembly defining an optical axis adapted to effect focusing operation and zooming operation comprising:
   first lens holder means having first lens means mounted therein;
   second lens holder means having second lens means mounted therein;
   with movement of said first and said second lens holder means simultaneously along said optical axis operating to effect zooming operation and with movement of said first lens holder means along said optical axis separately from said second lens holder means operating to effect focusing operation;
   a zooming operation member operable upon rotation thereof to effect zooming operation;
   a focusing operation member operable upon rotation thereof to effect focusing operation;
   a first and a second intermediate member axially movable relative to each other but restrained from rotative movement relative to each other, said second intermediate member being affixed for rotation together with said zooming operation member;
   a fixed tube engaged with said second intermediate member to enable rotative movement thereof but restraining said second intermediate member from axial movement;
   means interposed between said focusing operation member and said first intermediate member to effect axial movement of said first intermediate member independently of said second intermediate member upon rotation of said focusing operation;
   means interposed between said first intermediate member and said first lens holder member to effect axial movement of said first lens holder member independently of said second lens holder member upon axial movement of said first intermediate member; and
   means interposed between said first and second intermediate members and said first and second lens holder members to effect simultaneous axial movement of said first and second lens holder members upon rotation of said first and second intermediate members.

4. An assembly according to claim 3 wherein said second intermediate member is rotated by rotative movement of said zooming operation member and is restrained from axial movement by the engagement thereof with said barrel member and wherein said first intermediate member is rotatable by the engagement thereof with said second intermediate member.

5. An assembly according to claim 3 wherein said means interposed between said focusing operation member and said first intermediate member comprise a slanted slot formed in said focusing operation member, a first longitudinal slot formed in said barrel means, a circumferential recess formed in said first intermediate member, and a pin having one end thereof engaged in said circumferential recess and extending through said longitudinal slot into engagement with said slanted slot.

6. An assembly according to claim 3 wherein said means interposed between said first intermediate member and said first lens holder member and said means interposed between said first and second intermediate members and said first and second lens holder members comprise a second and a third longitudinal slot extending generally parallel to said optical axis formed in said barrel means, a slanted slot formed in said first intermediate member, a slanted slot formed in said second intermediate member, a lens holder pin affixed to said first lens holder member extending through said second longitudinal slot into engagement with said slanted slot in said first intermediate member, and a lens holder pin affixed to said second lens holder member extending through said third longitudinal slot into engagement with said slanted slot in said second intermediate member.

7. An assembly according to claim 3 wherein said first and second intermediate members include a tongue on one of said members and a slot in the other of said members, said tongue being fitted into said slot for sliding movement relative thereto in the direction of said longitudinal axis but fitted to restrain relative rotative movement between said first and second intermediate members.

8. An assembly according to claim 3 wherein said second intermediate member and said barrel means are engaged with each other by a protruberent part on one of said members engaging into a slot in the other of said members, said protruberent part and said slot being circumferentially slidable but axially immovable relative to each other.

* * * * *